(12) United States Patent
Stadelmann et al.

(10) Patent No.: US 7,585,139 B2
(45) Date of Patent: Sep. 8, 2009

(54) BORING TOOL

(75) Inventors: Rudolf Stadelmann, Niederuzwil (CH);
Ralph Stadelmann, Niederweningen (CH); Ernst Hänggi, Niederglatt (CH)

(73) Assignee: Heinz Kaiser AG (CH)

( * ) Notice: Subject to any disclaimer, the term of this patent is extended or adjusted under 35 U.S.C. 154(b) by 102 days.

(21) Appl. No.: 11/411,460

(22) Filed: Apr. 26, 2006

(65) Prior Publication Data

US 2006/0239787 A1    Oct. 26, 2006

(30) Foreign Application Priority Data

Apr. 26, 2005    (CH) .................................. 00734/05

(51) Int. Cl.
*B23B 29/03*    (2006.01)

(52) U.S. Cl. .................. 408/181; 408/185; 408/197

(58) Field of Classification Search ................ 408/181, 408/185, 153, 197; *B23B 29/00, 29/03, 29/034*
See application file for complete search history.

(56) References Cited

U.S. PATENT DOCUMENTS

| | | | | |
|---|---|---|---|---|
| 973,542 A | * | 10/1910 | Muehlmatt .................... 279/6 |
| 2,125,005 A | * | 7/1938 | Jearum ........................ 407/74 |
| 2,654,610 A | * | 10/1953 | De Vlieg ...................... 279/6 |
| 2,661,218 A | * | 12/1953 | Snow et al. ................... 279/6 |
| 2,874,597 A | * | 2/1959 | Bach ......................... 408/16 |
| 2,906,145 A | * | 9/1959 | Morse ....................... 408/181 |
| 3,144,792 A | * | 8/1964 | Marchis ..................... 408/181 |
| 3,516,134 A | * | 6/1970 | Heuser ....................... 407/37 |
| 3,518,738 A | * | 7/1970 | Porter ........................ 407/74 |
| 3,682,561 A | * | 8/1972 | Lemery et al. .............. 408/153 |
| 3,709,625 A | * | 1/1973 | Erkfritz ..................... 408/181 |
| 3,937,587 A | * | 2/1976 | Lindem et al. .............. 408/181 |
| 4,599,769 A | * | 7/1986 | Latzko et al. ............... 29/26 A |
| 4,710,073 A | * | 12/1987 | Peterson .................... 408/181 |
| 4,878,787 A | * | 11/1989 | Hunt ........................ 408/181 |
| 5,316,417 A | | 5/1994 | Romi |
| 5,396,693 A | * | 3/1995 | Lohner ..................... 29/527.1 |
| 5,454,667 A | * | 10/1995 | Cirino et al. ............... 408/181 |
| 5,909,986 A | * | 6/1999 | Kaiser et al. ............... 408/181 |

FOREIGN PATENT DOCUMENTS

| | | | |
|---|---|---|---|
| DE | 43 32 520 A1 | | 4/1994 |
| FR | 835378 | * | 12/1938 |
| GB | 559442 | * | 2/1944 |
| SU | 1053974 A | * | 11/1983 |

* cited by examiner

*Primary Examiner*—Daniel W Howell
(74) *Attorney, Agent, or Firm*—Lerner, David, Littenberg, Krumholz & Mentlik, LLP

(57) ABSTRACT

The boring tool has a tool body (2) on which a tool carrier (10) is mounted in a radially adjustable manner. A setting member (42) serves to set the boring diameter. A drive mechanism converts a rotation of the setting member (42) into a displacement of the tool carrier (10). The drive mechanism has a differential spindle (13) which converts a rotation of a graduated disk (26) into a displacement of the tool carrier (10) for the fine setting of the boring diameter. The differential spindle (13) is mounted in a bore (51) of the tool carrier (10) and extends at right angles to the rotation axis (A).

8 Claims, 2 Drawing Sheets

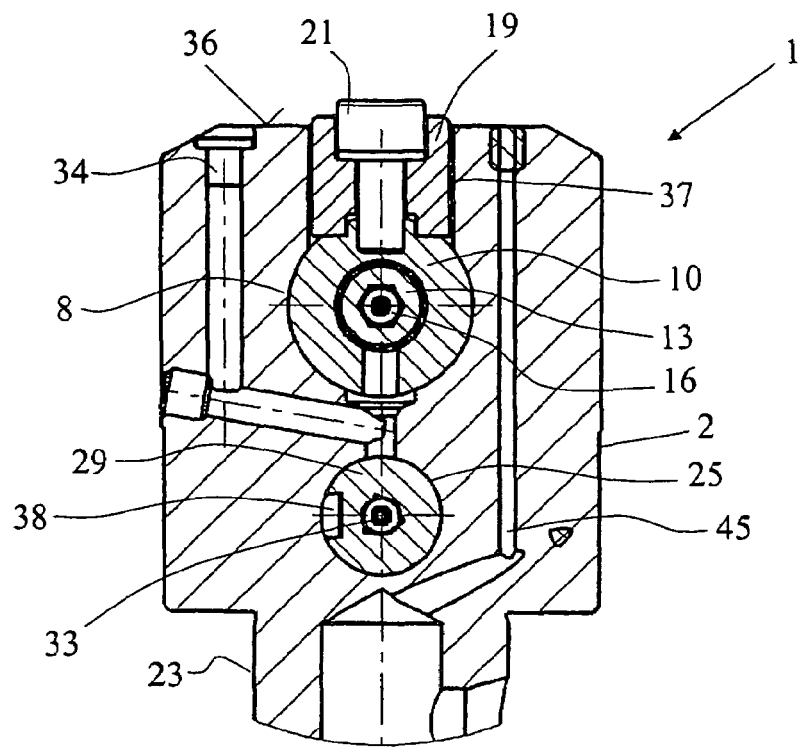
Fig. 3
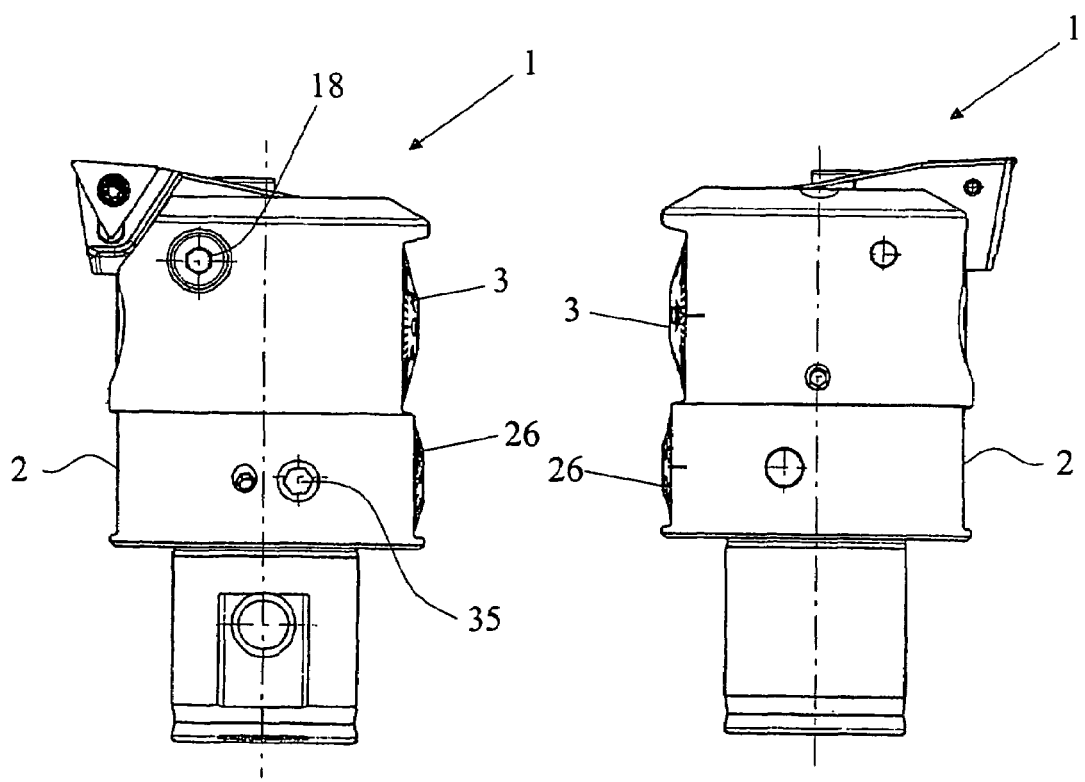
Fig. 4 Fig. 5

BORING TOOL

SUMMARY OF THE INVENTION

The invention relates to a boring tool having a tool body on which a tool carrier is mounted in an adjustable manner, having a rotatable setting member with which the tool carrier is radially displaceable via a drive mechanism for setting the boring diameter, the drive mechanism converting a rotation of the setting member into a displacement of the tool carrier.

Boring tools have been known for a long time. They serve, for example, in particular for the finish machining of precision bores. On the tool body, the tool as a rule is an indexable-insert holder which is releasably mounted on the tool carrier for the coarse setting. The drive mechanism serves for the fine setting of the outside diameter with the range of a few μm or micrometers.

A boring tool of said type has been disclosed by DE-A-43 32 520. In the axial direction, this boring tool has a cylindrical bore in which an adjusting screw having a fine-pitch thread is mounted. This adjusting screw is connected to a setting wheel. The setting wheel and adjusting screw are arranged coaxially. A displacement part can be adjusted in the axial direction by actuating the adjusting screw at the setting wheel. Arranged on this displacement part are notches which are at a comparatively small angle to the longitudinal axis. By means of the notches, a longitudinal adjustment is converted into a perpendicular adjustment and thus into a displacement of a bit holder. With the displacement part or said notches, it is possible to achieve an even more accurate fine setting. However, the drive mechanism provided here for converting the rotary movement of the setting member into a displacement of the bit holder requires a comparatively large overall length. In addition, the construction of this boring tool is comparatively complicated.

The object of the invention is to provide a boring tool of said type which can be realized in a simpler and also space-saving manner.

In a boring tool of the generic type, the object is achieved in that the drive mechanism is a differential spindle which converts a rotary movement of the setting member into a displacement of the tool carrier for the fine setting of the boring diameter.

In the boring tool of the generic type, the drive mechanism can be realized with few individual parts and in a compact type of construction and very cost-effectively. Due to a corresponding difference in the thread pitches, the differential spindle permits a very high transmission ratio while at the same time permitting small play. In the boring tool according to the invention, a scale is thus possible on the setting member, in which scale the distance between two scale lines corresponds to a displacement movement of one μm.

According to a development of the invention, provision is made for the differential spindle to be mounted in a bore of the tool carrier. In this case, an especially short type of construction is possible when the bore and thus the differential spindle run transversely to the rotation axis of the tool carrier. The comparatively short type of construction results in high stability.

According to a development of the invention, provision is made for the setting member to have a graduated dial which is arranged laterally on the tool body. This permits a simple and accurate setting, for example by means of hexagon key.

According to a development of the invention, provision is made for the setting member to have a drive spindle which is connected to the differential spindle in a longitudinally displaceable manner.

In this case, the drive spindle is mounted by means of a mounting disk on a nut which is operatively connected to the differential spindle. The nut is in this case firmly connected to the tool body. When the drive spindle is rotated, the differential spindle is rotated and the tool carrier is displaced radially in accordance with the difference in the thread pitches.

Further advantageous features follow from the dependent patent claims, the description below and the drawing.

BRIEF DESCRIPTION OF THE DRAWINGS

An exemplary embodiment of the boring tool according to the invention is described in more detail below with reference to the drawing, in which:

FIG. 3 shows a section through the boring tool along line III-III in FIG. 2, FIG. 4 shows a side view of the boring tool, and FIG. 5 shows a further side view of the boring tool according to the invention.

DETAILED DESCRIPTION

Figure 1:
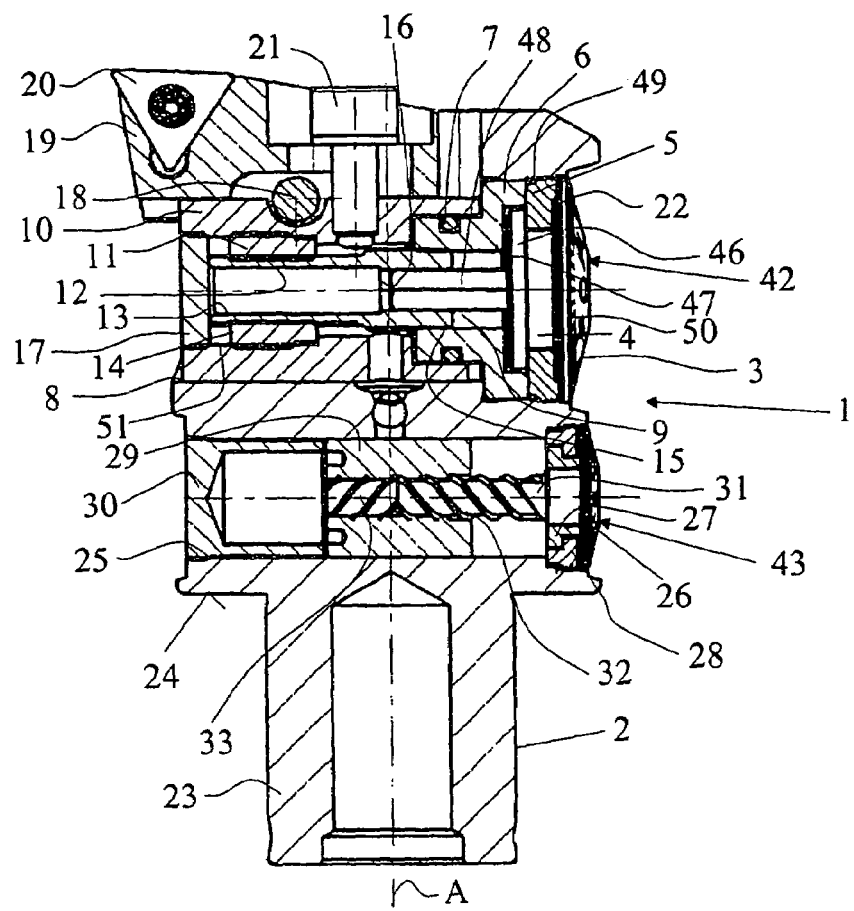
FIG. 1 shows a section through the boring tool according to the invention along line I-I in FIG. 2.

FIG. 1 shows a boring head 1 which has a tool body 2 which has a radial bore 8, in which a tool carrier 10 is mounted in such a way as to be radially displaceable to a limited extent. As can be seen, the bore 8 is a continuous stepped bore. At a distance from the bore 8, the tool body 2 has a further bore 25, which runs parallel to the bore 8 and in which a balancing weight 29 can be displaced by means of a spindle 31 for compensating for unbalance. Both bores 8 and 25 run at right angles to the rotation axis A of the boring head 1. In addition, the tool body 2 has a shank 23, with which the boring head 1 can be connected to a shank (not shown here) or the like, a surface 24 being pressed against this shank or the like by means of at least one clamping screw (not shown here).

According to FIG. 3, the tool carrier 10 is arranged below a groove 37, which is incorporated in the end face 36 of the tool body 2 and in which an indexable-insert holder 19 is mounted in such a way as to be radially displaceable to a limited extent. The indexable-insert holder 19 can be clamped in place on the tool carrier 10 by means of a clamping screw 21.

Figure 2:
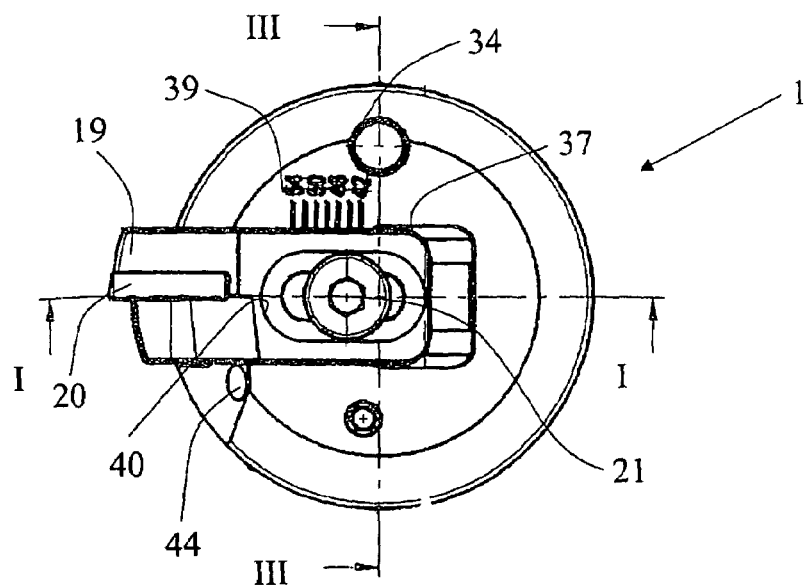
FIG. 2 shows a view of the boring tool according to FIG. 1 in the axial direction.

As FIG. 2 shows, the clamping screw 21 passes through an elongated hole 40 of the indexable-insert holder 19. The latter can thus be radially adjusted in the region of the elongated hole 40 when clamping screw 21 is released. A coarse setting of the outside diameter is possible by such a radial adjustment. To this end, a scale 39 is provided on the end face 36 of the tool body 2.

An indexable insert 20 known per se is arranged on the indexable-insert holder 19. The distance of the cutting edge of this indexable insert 20 from the rotation axis A produces the boring radius. According to FIG. 2, a lubricating nipple 34 and a cooling-water outlet 44 are arranged in the end face 36 in a manner known per se. The cooling water enters at the shank 23 and is fed to the cooling-water outlet 44 via the passage 45 shown in FIG. 3.

Provided for the fine setting of the boring diameter is a drive 41, which converts a rotary movement of a setting member 42 into a radial displacement of the tool carrier 10 and thus into a radial displacement of the indexable-insert holder 19. The setting member 42 has a drive spindle 4, which is shown in elevation in FIG. 1 and is rotatably mounted with a mounting disk 5 on a nut 6. For mounting the drive spindle 4, said drive spindle has a collar 46 which is pressed with a disk spring 47 against the mounting disk 5. In addition, the drive spindle 4 has a polygonal profile rod 48, which engages in a corresponding polygonal hole 16 of a differential spindle 13. The nut 6 and the mounting disk 5 are firmly connected to the tool body 2. The nut 6 is sealed off from the tool carrier 10 by means of a sealing ring 7. The drive spindle 4 can be rotated about the axis of the polygonal profile rod 48, but the distance from the rotation axis A is always retained. To fasten the mounting disk 5 to the tool body 2, said mounting disk 5 has an external thread 49 which can be screwed into a corresponding internal thread of the bore 8.

Screwed onto the drive spindle 4 is a graduated dial 3, which has a line scale 50 and a hexagonal hole (not shown here) as an application point for a tool, in particular a hexagon key. A disk spring 22 is arranged between the graduated dial 3 and the mounting disk 5. When the graduated dial 3 is rotated clockwise or counterclockwise, the drive spindle 4 thus rotates with it free of play.

The tool carrier 10 has a longitudinal bore 51, into which a threaded sleeve 11 is screwed and firmly connected to the tool carrier 10, for example by gluing. This threaded sleeve 11 has an internal thread 12, into which a differential spindle 13 having an external thread 14 is screwed. The longitudinal bore 51 is closed with a screwed-in sealing plug 17. The differential spindle 13 has a further external thread 15, onto which the nut 6 having an internal thread 9 is screwed. The two threads 14 and 15 have the same hand and different thread pitches. By rotating the graduated dial 3, the differential spindle 13 can be rotated in the same direction, the differential spindle 13 being displaced in the longitudinal direction in the bore 51 in accordance with the thread pitch 15. Since the threaded sleeve 11 is now firmly connected to the tool carrier 10, the rotary movement of the differential spindle 13 at the thread 14 causes a displacement of the tool carrier 10 in the bore 8. In the process, the tool carrier 10 is displaced against the displacement direction of the differential spindle 13 by the difference in the thread pitches 14 and 15. The thread pitch of the external thread 14 is, for example, 0.25 mm and the thread pitch of the thread 15 is 0.275 mm. The difference in the thread pitches is therefore 0.025 mm. A rotation of the graduated dial 3 by one line spacing then amounts, for example, to a displacement of the bit holder 19 by 1 μm in diameter. The mechanism which is formed by the differential spindle 13 and the corresponding threads 14 and 15 or the nut 6 and the threaded sleeve 11 is characterized by a simple construction of few parts and by being largely free of play.

After the outside diameter has been set, the boring head 1 has to be balanced as a rule. To this end, a further setting member 43 is provided, this setting member 43 having a graduated dial 26 which can likewise be rotated, for example, using a hexagon key. The graduated dial 26 forms a spindle 31 having a comparatively coarse-pitch external thread 32, which is screwed into an internal thread 33 of the balancing weight 29. To mount the spindle 31, a mounting disk 28 which accommodates a nut 27 is screwed into the bore 25. When the spindle 31 is rotated, the balancing weight 29 is displaced to the right or left in FIG. 1. The bore 25 is closed with a sealing plug 30 on the left in FIG. 1. The balancing weight 29 can be fixed by means of a clamping screw 35 shown in FIG. 4.

The setting of the boring diameter is explained in more detail below.

To set the desired boring diameter, first of all the indexable-insert holder 19 is released by releasing the clamping screw 21. A coarse radial setting of the indexable-insert holder 19 is now effected manually by means of the scale 39. The clamping screw 21 is then tightened using a hexagon key and thus the indexable-insert holder 19 is secured to the tool carrier 10. The hexagon key or a suitable tool or a hand wheel (not shown here) is now applied to the graduated dial 3, and the graduated dial is rotated for the fine setting of the boring diameter. In the process, the tool carrier 10 together with the indexable-insert holder 19 is displaced radially. In this case, the line scale 50 indicates the value by which the indexable-insert holder 19 is displaced. Here, the distance between two scale lines amounts to, for example, 1 μm in diameter. If the desired boring diameter has been set, the tool carrier 10 is fixed to the tool body 2 by tightening the clamping screw 18.

In order to balance the boring head 1, the balancing weight 29 is moved to the right or left in FIG. 1 by rotating the graduated dial 26. So that the balancing weight 29 is not rotated and is only displaced in the longitudinal direction of the bore 25, a key 38 which guides the balancing weight 29 is provided according to FIG. 3. The sealing plug 30 forms a counterweight to the setting member 43. The boring diameter and the compensation for the unbalance are thus set independently of one another. The set position of the balancing weight 29 is fixed by means of a clamping screw 35. The setting member 42 and the setting member 43 are arranged on the same side of the boring head 1 and directly one above the other, which facilitates the setting.

LIST OF DESIGNATIONS

1 Boring head
2 Tool body
3 Graduated disk
4 Drive spindle
5 Mounting disk
6 Nut
7 Sealing ring
8 Bore
9 Internal thread
10 Tool carrier
11 Threaded sleeve
12 Internal thread
13 Differential spindle
14 External thread (spindle)
15 External thread (spindle)
16 Polygonal hole
17 Sealing plug
18 Clamping screw
19 Indexable-insert holder
20 Indexable insert
21 Clamping screw
22 Disk spring
23 Shank
24 Surface
25 Bore
26 Graduated disk
27 Nut
28 Mounting disk
29 Compensating weight
30 Sealing plug
31 Spindle
32 Thread
33 Tapped hole
34 Lubricating nipple
35 Clamping screw
36 End face
37 Groove
38 Key
39 Scale 40 Elongated hole
41 Drive
42 Setting member
43 Setting member
44 Cooling-water outlet
45 Cooling-water passage
46 Collar
47 Disk spring
48 Polygonal profile rod
49 External thread
50 Line scale
51 Bore
A rotation axis

The invention claimed is:

1. A boring tool, comprising:
   a tool body having an end face and a groove at the end face;
   a tool carrier mounted below the groove in the tool body;
   an indexable insert holder disposed in the groove wherein the holder is releasably coupled to the tool carrier using a screw, wherein the holder provides for a coarse setting of a bore diameter for the boring tool;
   a rotatable setting member disposed on the tool body, for transversely displacing the tool carrier; and
   a drive mechanism for setting the boring diameter, the drive mechanism converts a rotation of the setting member into a displacement of the tool carrier and has a differential spindle which converts the rotation of the setting member into a fine displacement of the tool carrier, wherein the setting member has a drive spindle which is connected to the differential spindle, wherein the drive spindle and the differential spindle do not rotate about each other and wherein the drive spindle has a polygonal profile rod which engages in a polygonal hole of the differential spindle, wherein the differential spindle is operatively connected to a nut which is firmly connected to the tool body, and the drive spindle being rotatably mounted with a mounting disk on the nut, the mounting disk being firmly connected to the tool body.

2. The boring tool as claimed in claim 1, wherein the differential spindle is mounted in a bore of the tool carrier.

3. The boring tool as claimed in claim 2, wherein the bore and the differential spindle extend transversely to the rotation axis of the boring tool.

4. The boring tool as claimed in claim 1, wherein the setting member has a graduated dial which is arranged laterally on the tool body.

5. The boring tool as claimed in claim 1, wherein the differential spindle has first and second external threads, the first external thread being operatively connected to the tool carrier and the second external thread being operatively connected to the tool body.

6. The boring tool as claimed in claim 1, characterized in that the differential spindle is screwed into a threaded sleeve which is connected to the tool carrier.

7. The boring tool as claimed in claim 1, wherein a balancing weight is mounted in the tool body in a radially displaceable manner and can be radially adjusted by a second setting member.

8. The boring tool as claimed in claim 7, wherein the balancing weight is arranged in a transverse bore which runs parallel to a transverse bore in which the tool carrier is mounted.

\* \* \* \* \*